F. H. KAHN.
LENS MOUNTING FOR EYEGLASSES.
APPLICATION FILED AUG. 28, 1913.

1,097,129.

Patented May 19, 1914.

WITNESSES:
H. A. Stock.
Harry H Totten

INVENTOR
Fernando H. Kahn,
BY
R. Acker
his ATTORNEY

COLUMBIA PLANOGRAPH CO., WASHINGTON, D. C.

UNITED STATES PATENT OFFICE.

FERNANDO H. KAHN, OF SAN FRANCISCO, CALIFORNIA.

LENS-MOUNTING FOR EYEGLASSES.

1,097,129.  Specification of Letters Patent.  Patented May 19, 1914.

Application filed August 28, 1913. Serial No. 787,099.

*To all whom it may concern:*

Be it known that I, FERNANDO H. KAHN, citizen of the United States, residing at No. 644 Market street, in the city and county of San Francisco and State of California, have invented certain new and useful Improvements in Lens-Mountings for Eyeglasses, of which the following is a specification.

The present invention relates to improvements in the art of mounting lenses of eyeglasses or spectacles, the principal objects of the invention being to provide a securing means which will prevent the lenses from becoming loose, one which is simple in construction, neat in appearance, and one which does not require the re-grinding of the lenses after the mounting has been attached thereto.

With the above mentioned and other objects in view, the invention consists in the novel construction and combination of parts hereafter more fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying sheet of drawings, wherein—

Figure 1:
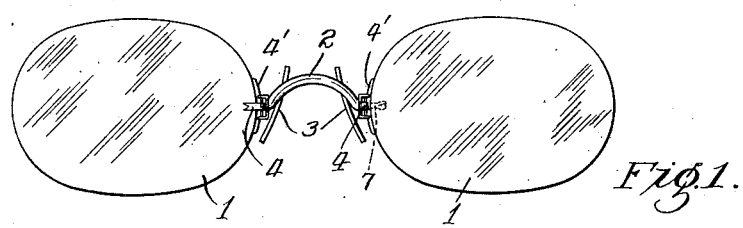
Figure 2:
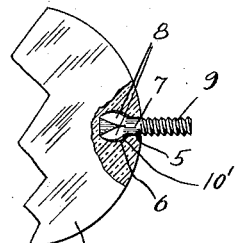
Figure 3:
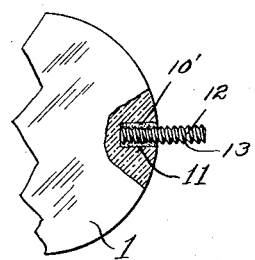
Figure 4:
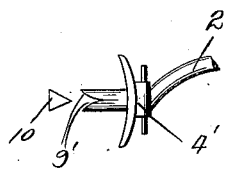

Figure 1 is a view in elevation of a pair of eye-glasses, wherein the lenses are secured in position by my improved construction. Fig. 2 is a view in elevation of a lens partly broken away, disclosing the preferred form of my improved fastening. Fig. 3 is a view similar to Fig. 2, disclosing a modified form of securing means. Fig. 4 is a view of the slotted stud or pin with the wedge in a position to engage and spread the prongs thereof.

Referring more particularly to the drawings wherein like characters of reference designate corresponding parts throughout the several views, 1 indicates the lenses of a pair of eye-glasses, although it is apparent that the invention is applicable to a pair of lenses for spectacles. The lenses are mounted in a hereinafter described manner to a bridge piece 2 of the well known construction, and said bridge piece is provided adjacent its ends with the pivoted gripping members 3, finger pieces 4 of the well known construction, and studs 4'.

A suitable bore 5 having an enlarged cavity 6 at its inner end is drilled or formed in any other suitable manner in the peripheral edge of each lens, and in each of said bores is inserted the end of a dowel or pin 7 split or slotted for a portion of its length forming fingers 8, and said dowel or pin is preferably threaded on its opposite end, as at 9, for attaching to the stud 4', although it is to be understood that the dowel may be attached to the stud 4' in any other suitable manner, or it may be formed integral therewith. The ends of the fingers 8 are beveled as at 9', and in the space formed between the beveled faces is inserted a wedge 10, which, on contacting with the base of the enlarged cavity 6, forces the fingers formed by the slot outwardly, until the same are expanded or forced apart for such distance as to prevent the withdrawing of the dowel or pin from the bore.

In attaching a lens to a dowel or pin, a quantity of suitable liquid cement or adhesive 10' is deposited in the bore 5 and cavity 6, and the wedge 10 is placed between the beveled faces 9' of the fingers, and when in this position the dowel is forced into the bore, and the base of the wedge contacting with the base of the cavity 6 will be forced between the beveled faces of the arms and cause the same to be flared outwardly as in Fig. 2 of the drawings, and it will be apparent that when the cement or adhesive sets, that the lens will be securely mounted on the dowel, and there will not be the danger of the lens working loose from its mounting as is the case where the transverse screw fastening means is employed.

In Fig. 3, I have disclosed a structure in which the lens is formed with a suitable bore having parallel side walls which are roughened or threaded throughout their length as at 11, and in said bore is positioned a dowel or pin 12 which is threaded throughout its length as at 13. In securing said dowel or pin in the bore, a quantity of fluid cement or adhesive 10' is deposited in the bore, one end of the threaded dowel or pin is inserted therein as in Fig. 3, and on the setting of the adhesive or cement, the adhesion of the same to the roughened surface 11 and to the threads 13 will securely retain the dowel or pin in position and prevent the same from being drawn from the bore.

From the above description it will be apparent that I have constructed a lens mounting which will retain the lens in position more securely than in the structures now employed where a screw is passed through straps formed integral with the stud and also passed through the lens.

In my improved mounting I have dispensed with that type of mounting wherein a suitable composition is attached to the peripheral edges of the lens and the mounting is secured therein and have provided a structure which is neat in appearance, one which does not require that any additional material be added to the lens and one which does not interfere with or reduce the field of the lens.

Having thus described my invention, what I claim and desire to protect by Letters Patent is:—

1. In a lens mounting and in combination with a lens formed with a bore in its peripheral edge, said bore being open only at the peripheral edge of said lens, and a stud having a dowel projected therefrom for securing in said bore.

2. In a lens mounting, the combination with a lens formed with a bore in its peripheral edge, said bore being open only at the peripheral edge of said lens, a stud having a dowel projected therefrom for insertion in said bore, and a plastic binder in said bore for securing said dowel in position.

3. In a lens mounting, the combination with a lens formed with a bore in its peripheral edge, said bore being open only at the peripheral edge of said lens, a stud, and a dowel adapted for securing at one end in said bore and at its opposite end for attachment to said stud.

4. In a lens mounting, the combination with a lens formed with a bore in its peripheral edge, said bore being open only at the peripheral edge of said lens, a stud, a dowel adapted for insertion at one end in said bore and at its opposite end for attachment to said stud, and a plastic binder in said bore for securing said dowel in said bore.

5. In a lens mounting, the combination with a lens formed with a bore extending inwardly from its peripheral edge, said bore being open only at the peripheral edge of said lens and having an enlarged chamber at its inner end, a stud having a dowel projected therefrom for insertion in said bore and enlarged chamber, said dowel being slotted at its outer end forming arms, and means for spreading said arms in said enlarged chamber on the insertion of the dowel therein.

6. In a lens mounting, the combination with a lens formed with a bore extending inwardly from its peripheral edge, said bore being open only at the peripheral edge of said lens and having an enlarged chamber at its inner end, a stud provided with a dowel projected therefrom for insertion in said bore and enlarged chamber and slotted at its outer end, forming arms, means for spreading said arms in said enlarged chamber on the insertion of the dowel therein and a plastic binder in said bore and enlarged chamber for securing the dowel therein.

7. In a lens mounting, the combination with a lens formed with a bore extending inwardly from its peripheral edge, a stud, said bore being open only at the peripheral edge of said lens, a dowel provided at one end with arms adapted for insertion in said bore and at its opposite end for attachment to said stud, and means for forcing said arms outwardly against the walls of said bore on the insertion of the same therein.

In testimony whereof I have signed my name to this specification in the presence of two subscribing witnesses.

FERNANDO H. KAHN.

Witnesses:
HARRY A. TOTTEN,
D. B. RICHARDS.

Copies of this patent may be obtained for five cents each, by addressing the "Commissioner of Patents, Washington, D. C."